United States Patent
De Toni et al.

(10) Patent No.: US 12,093,672 B2
(45) Date of Patent: Sep. 17, 2024

(54) ITERATIVE NEURAL CODE TRANSLATION

(71) Applicant: Google LLC, Mountain View, CA (US)

(72) Inventors: Giovanni De Toni, Recoaro Terme (IT); Rishabh Singh, San Jose, CA (US); Jonathan Malmaud, Campbell, CA (US); Navneet Potti, Sunnyvale, CA (US)

(73) Assignee: GOOGLE LLC, Mountain View, CA (US)

(*) Notice: Subject to any disclaimer, the term of this patent is extended or adjusted under 35 U.S.C. 154(b) by 0 days.

(21) Appl. No.: 18/076,189

(22) Filed: Dec. 6, 2022

(65) Prior Publication Data

US 2024/0184555 A1  Jun. 6, 2024

(51) Int. Cl.
| | |
|---|---|
| G06F 9/44 | (2018.01) |
| G06F 8/41 | (2018.01) |
| G06F 8/51 | (2018.01) |
| G06F 9/455 | (2018.01) |
| G06F 11/36 | (2006.01) |
| G06N 3/045 | (2023.01) |
| G06N 3/0455 | (2023.01) |
| G06N 3/08 | (2023.01) |
| G06N 20/00 | (2019.01) |

(52) U.S. Cl.
CPC ............... G06F 8/51 (2013.01); G06F 8/42 (2013.01); G06F 11/3616 (2013.01); G06N 3/0455 (2023.01); G06N 3/08 (2013.01)

(58) Field of Classification Search
CPC .......... G06F 8/51; G06F 8/42; G06F 11/3616; G06F 18/23; G06F 11/366; G06F 11/3604; G06F 11/3664; G06F 11/3636; G06F 11/3688; G06F 11/0793; G06F 11/0778; G06N 3/0455; G06N 3/08; G06N 3/088; G06N 20/00

See application file for complete search history.

(56) References Cited

U.S. PATENT DOCUMENTS 11,176,019 B2 *  11/2021  Shao ..................... G06N 3/088

OTHER PUBLICATIONS

Joshi et al., "SpanBERT: Improving Pre-training by Representing and Predicting Spans" arXiv:1907.10529v3 [cs.CL] 13 pages, dated Jan. 18, 2020.

(Continued)

*Primary Examiner* — Thuy Dao
(74) *Attorney, Agent, or Firm* — Gray Ice Higdon (57) ABSTRACT

Techniques are described herein for iterative code generation using neural language models. In various implementations, an original source code snippet in a first programming language may be processed using a translation machine learning model to generate a first translation of the original source code snippet in a second programming language. The first translation of the original source code snippet may be evaluated to identify error(s) in the first translation. Based on the error(s), respective mask(s) may be inserted to generate a masked first translation of the original source code snippet in the second programming language. The masked first translation of the original source code snippet may be processed using the translation machine learning model to generate a second translation of the original source code snippet in the second language. The second translation may include infill(s) of corrected source code in place of one or more of the masks.

20 Claims, 7 Drawing Sheets

(56) References Cited

OTHER PUBLICATIONS

Chen et al., "Improving the Efficiency of Grammatical Error Correction with Erroneous Span Detection and Correction" arXiv:2010.03260v1 [cs.CL] 8 pages, dated Oct. 7, 2020.
Bavarian et al., "Efficient Training of Language Models to Fill in the Middle" arXiv:2207.14255v1 [cs.CL] 30 pages, dated Jul. 28, 2022.
Aghajanyan et al., "CM3: A Causal Masked Multimodal Model of the Internet" arXiv: 2201.07520v1 [cs.CL] 20 pages, dated Jan. 19, 2022.
Raffel et al., "Exploring the Limits of Transfer Learning with a Unified Text-to-Text Transformer" Journal of Machine Learning Research 21 (2020) pp. 1-67, dated Jun. 2020.
Fried et al., "InCoder: a Generative Model for Code Infilling and Synthesis" arXiv:2204.05999v2 [cs.CL] 25 pages, dated Apr. 17, 2022.
Liang et al., "Neutron: an Attention-Based Neural Decompiler" Anonymous Cybersecurity. Retrieved from https://doi.org/10.1186/s42400-021-00070-0. 13 pages, dated 2021.

\* cited by examiner

```
public static void main(String[] args) {

ArrayList<String> companies = new ArrayList<String>(
            Arrays.asList("Alpha", "Beta", "Theta")
    companies.add("Zeta")
    for (int i = 0; i < 4; i++) {
            System.out.println(company.get(i));
        }

}
```

```
@JvmStatic fun main(args: Array<String>) {            ─220
  val companies = new ArrayList<String>(
                Arrays.asList("Alpha", "Beta", "Theta"))
  companies.add("Zeta")
   for (i in 0..2) {
     println(companies.get(i))
   }}            ─222
                         ─224
```

ITERATIVE NEURAL CODE TRANSLATION

BACKGROUND

Computer software programming often requires developers to read and/or write source code (i.e., to program) in a specific language, e.g. Java, C++, C, Python, etc. Each programming language has its own strengths, weaknesses, nuances, idiosyncrasies, etc. Additionally, some programming languages are more suitable for certain stages of software development and/or a software life cycle than others. As one example, scripting languages such as Python, JavaScript, Perl, etc., are often more effectively used near the very beginning of software development because programmers using these languages are able to turn around functional software relatively quickly. Most programmers obtain at least a superficial understanding of multiple programming languages, but only master a few. Consequently, each programming language tends to have its own talent pool.

Large language models such as transformer networks have become increasingly popular for performing natural language processing. Transformer networks were designed in part to mitigate a variety of shortcomings of prior natural language processing models, such as overfitting, the vanishing gradient problem, and exceedingly high computational costs, to name a few. However, when used to translate source code, e.g., from one language to another or from one style to another, language models sometimes fail to properly translate expressions that are idiomatic to particular programming languages, or to particular programming styles or standards.

SUMMARY

Implementations are described herein for iterative code generation using neural language models. More particularly, but not exclusively, techniques are described herein for identifying errors in source code that is generated (e.g., translated or completed) using a neural language model based on original source code. Those identified error(s) may be used to insert mask(s) into the generated source code. The now-masked generated source code may be processed using the neural language model, e.g., in conjunction with the original source code, to generate a new version of the generated source code with the mask(s) infilled with correct (i.e. error free) source code. In some implementations, this process may be performed iteratively until no more errors are detected in the generated source code.

In some implementations, a method may be implemented by one or more processors and may include: processing an original source code snippet in a first programming language using a translation machine learning model to generate a first translation of the original source code snippet in a second programming language; evaluating the first translation of the original source code snippet to identify one or more errors in the first translation of the original source code snippet; based on the one or more errors in the first translation of the original source code snippet, inserting one or more respective masks to generate a masked first translation of the original source code snippet in the second programming language; and processing the masked first translation of the original source code snippet using the translation machine learning model to generate a second translation of the original source code snippet in the second language, wherein the second translation includes one or more infills of corrected source code in place of one or more of the masks.

In various implementations, the masked first translation of the original source code snippet may be processed using the translation machine learning model in conjunction with the original source code snippet in the first programming language. In various implementations, the masked first translation of the original source code snippet may be processed using the translation machine learning model as a prefix. In various implementations, the translation machine learning model may include an encoder and a decoder, the original source code snippet may be processed using the encoder, and the masked first translation of the original source code snippet may be processed as the prefix using the decoder.

In various implementations, the evaluation of the first translation of the original source code snippet may be performed using a static analyzer or a syntax checker. In various implementations, the evaluation of the first translation of the original source code snippet may be performed by compiling the first translation to generate an executable program, and executing the executable program using one or more test cases.

In various implementations, the evaluation of the first translation of the original source code snippet may be performed using one or more confidence properties of the translation machine learning model. In various implementations, the evaluation of the first translation of the original source code snippet may be performed using a machine learning model trained to detect errors in source code.

In various implementations, the masked first translation of the original source code snippet may be processed with a greater beam width than the original source code snippet. In various implementations, the one or more errors may be a first error, the one or more masks may be a first mask, the second translation may include a first infill of corrected source code in place of the first mask, and the method may further include: evaluating the second translation of the original source code snippet to identify a second error in the second translation of the original source code snippet; based on the second error in the second translation of the original source code snippet, inserting a second mask to generate a masked second translation of the original source code snippet in the second programming language; and processing the masked second translation of the original source code snippet using the translation machine learning model to generate a third translation of the original source code snippet in the second language, wherein the third translation includes a second infill of corrected source code in place of the second mask.

In various implementations, the inserting may include replacing the one or more errors with the one or more masks.

In a related aspect, a method may be implemented using one or more processors and may include: processing an original source code snippet in a first domain using a neural language model to generate a first translation of the original source code snippet in a second domain; evaluating the first translation of the original source code snippet to identify one or more errors in the first translation of the original source code snippet in the second domain; based on the one or more errors in the first translation of the original source code snippet, inserting one or more respective masks to generate a masked first translation of the original source code snippet in the second domain; and processing the masked first translation of the original source code snippet using the translation machine learning model to generate a second translation of the original source code snippet in the second domain, wherein the second translation includes one or more infills of corrected source code in place of one or more of the masks.

In various implementations, the masked first translation of the original source code snippet may be processed using the neural language model in conjunction with the original source code snippet. In various implementations, the masked first translation of the original source code snippet may be processed using the neural language model as a prefix. In various implementations, the neural language model may include an encoder and a decoder, the original source code snippet in the first domain may be processed using the encoder, and the masked first translation of the original source code snippet in the second domain may be processed as the prefix using the decoder.

In addition, some implementations include one or more processors of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Implementations are described herein for iterative code generation using neural language models. More particularly, but not exclusively, techniques are described herein for identifying errors in source code that is generated (e.g., translated) using a neural language model based on original source code. Those identified error(s) may be used to insert mask(s) into the generated source code. The now-masked generated source code may be processed using the neural language model, e.g., in conjunction with the original source code, to generate a new version of the generated source code with the mask(s) infilled with correct (i.e. error free) source code. In some implementations, this process may be performed iteratively until no more errors are detected in the generated source code.

Neural language models may take various forms. In the present context, neural language models may be referred to as "translation machine learning models" because they are being used to translate source code from one domain to another, whether from a first programming language to a second programming language, or via an intra-programming language translation from a first style, buggy code, etc. to a second style, non-buggy code, etc. In some implementations, a translation machine learning model may be a transformer model. Transformer models may take various forms, such as an encoder-only (e.g., a bidirectional encoder representations from transformers, or "BERT"), encoder-decoder, causal decoder-based models, etc.

In various implementations, a translation machine learning model configured with selected aspects of the present disclosure may be used to generate new source code based on original source code. In some implementations, and in many examples described herein, the original source code may be in a first programming language (e.g., Java, Python) and the new source code may be in a second programming language (e.g., Kotlin). In this case, the translation machine learning model is being used to translate from the first programming language to the second. Additionally or alternatively, in some implementations, the original and new source code may be in the same programming language, but the original source code may be buggy, erroneous, or in an undesirable style, and the new source code may be correct, non-erroneous, and/or in a desirable style. In this case, the translation machine learning model is being used to "clean up" the original source code. Accordingly, while various examples described herein will relate to translation across different programming languages, it should be understood that disclosed techniques are also applicable to intra-programming language translation, e.g., from one style to another, as well as general code generation applications such as code generation from natural language or code completion.

During a first attempt to translate original source code from a first programming language to a second programming language, various errors may be generated. For example, the translation may fail to capture various idioms of the second programming language, or may introduce logical errors, type errors, application programming interface (API) errors, etc. Rather than correcting these manually, various techniques may be performed to identify these errors in the translated source code (e.g., automatically), so that masks can be inserted based on these errors. For example, external tools such as compilers, static analyzers, syntax checkers, etc., may be used to analyze the translated code and identify errors. In some implementations, another machine learning model may be trained, e.g., based on training data that includes source code with labeled errors, to detect errors. Some implementations may leverage the model's confidence probabilities of different output tokens to identify potential errors. And in some cases, a human programmer may identify error(s) manually.

However the errors in the translated source code are identified, those errors may be used to insert masks into the translated source code. For example, tokens that are considered erroneous may be replaced in the translated source code with mask(s) (which may be, for instance, predetermined sequences of characters or symbols that are not otherwise found natively in source code). In various implementations, the masked translated source code may be processed using the translation machine learning model, e.g., in conjunction with the original source code. In some implementations, this subsequent processing may be performed using a greater beam width than the original processing (e.g., beam width of four, as opposed to an original beam width of one). The output of this processing may include infills of corrected source code that are used to replace the mask(s) in the translated source code.

In some implementations, this process of detecting errors in translated source code, inserting masks, and generating infills may be performed iteratively, e.g., until no more errors are detected in the translated source code. For example, a single error may be identified (or at least replaced with a mask) during a given iteration. The masked translated source code may be processed using the translation machine learning model, e.g., along with the original source code. In some cases the masked translated source code may be processed as a prefix to the original source code. For example, the original source code may be processed using an encoder portion of the translation machine learning model to generate an embedding (e.g., a continuous vector embedding). This embedding may then be processed using a decoder portion of the translation machine learning model, e.g., along with the masked translated source code (e.g., which may be converted into its own embedding) to generate an infill for the current/error/mask. In other implementations, multiple errors may be detected (and infilled with corrected source code) during a single iteration.

Figure 1:
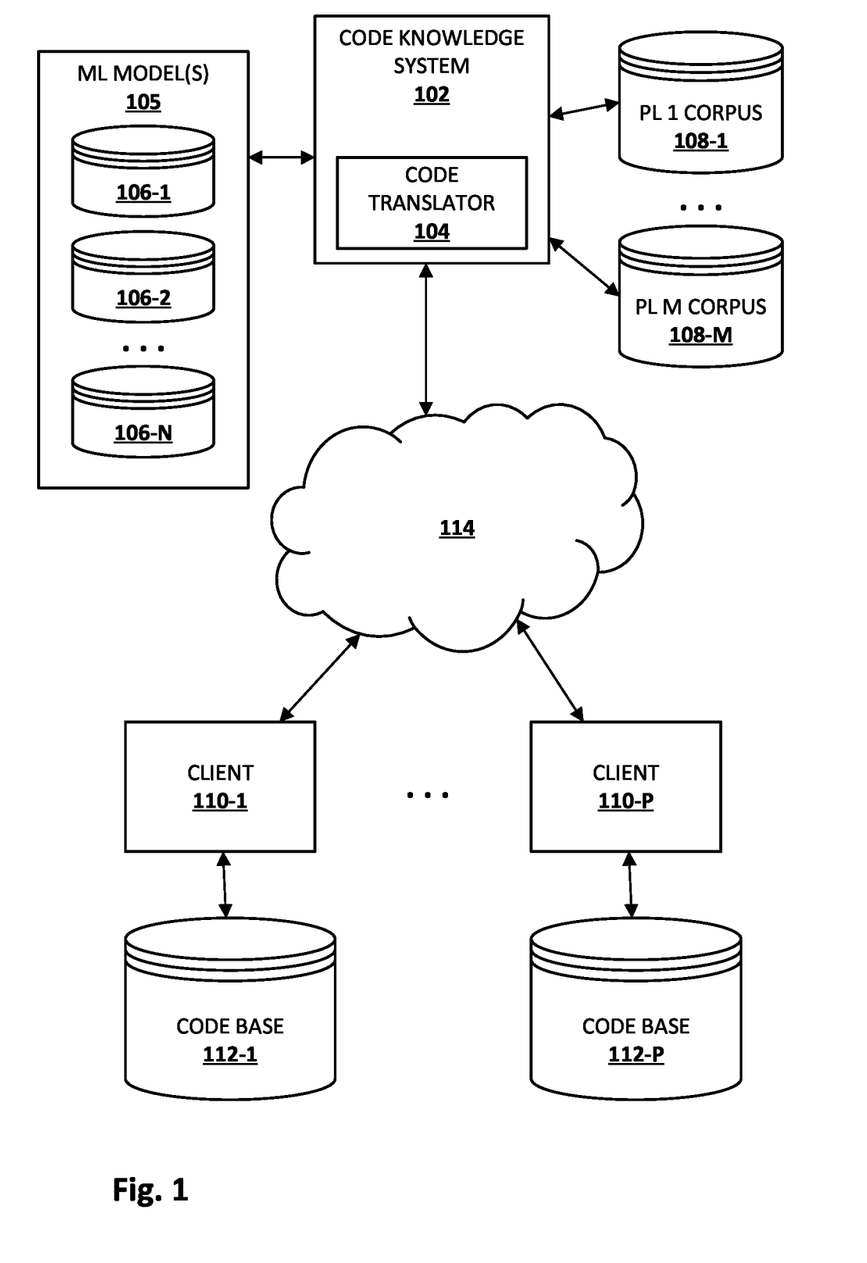
FIG. 1 schematically depicts an example environment in which selected aspects of the present disclosure may be implemented, in accordance with various implementations.

FIG. 1 schematically depicts an example environment in which selected aspects of the present disclosure may be implemented, in accordance with various implementations. Any computing devices depicted in FIG. 1 or elsewhere in the figures may include logic such as one or more microprocessors (e.g., central processing units or "CPUs", graphical processing units or "GPUs", tensor processing units or "TPUs") that execute computer-readable instructions stored in memory, or other types of logic such as application-specific integrated circuits ("ASIC"), field-programmable gate arrays ("FPGA"), and so forth. Some of the systems depicted in FIG. 1, such as a code knowledge system 102, may be implemented using one or more server computing devices that form what is sometimes referred to as a "cloud infrastructure," although this is not required.

A code knowledge system 102 may be provided for helping clients 110-1 to 110-P manage their respective code bases 112-1 to 112-P. Code knowledge system 102 may include, among other things, a code translator 104 that is configured to perform selected aspects of the present disclosure in order to help one or more clients 110-1 to 110-P to manage and/or make changes to one or more corresponding code bases 112-1 to 112-P. Each client 110 may be, for example, an entity or organization such as a business (e.g., financial institute, bank, etc.), non-profit, club, university, government agency, or any other organization that operates one or more software systems. For example, a bank may operate one or more software systems to manage the money under its control, including tracking deposits and withdrawals, tracking loans, tracking investments, and so forth. An airline may operate one or more software systems for booking/canceling/rebooking flight reservations, managing delays or cancellations of flight, managing people associated with flights, such as passengers, air crews, and ground crews, managing airport gates, and so forth.

Code translator 104 may be configured to leverage knowledge of multiple different programming languages in order to aid clients 110-1 to 110-P in translating between programming languages when editing, updating, re-platforming, migrating, or otherwise acting upon their code bases 112-1 to 112-P. For example, code translator 104 may be configured to translate code snippets from one programming language to another, e.g., on the fly or in batches. This may, for instance, enable a developer fluent in a first programming language to view and/or edit source code that was originally written in a second, less-familiar programming language in the first programming language. It may also significantly decrease the time and/or costs associated with migrating code bases between different programming languages.

In various implementations, code knowledge system 102 may include a machine learning ("ML" in FIG. 1) database 105 that includes data indicative of one or more trained machine learning models 106-1 to 106-N. These trained machine learning models 106-1 to 106-N may include a translation machine learning model (more generally, a "neural language model") that is trained to be used as a neural translator. Such a neural translator may take various forms, including but not limited to a BERT transformer, a GPT (Generative Pre-trained Transformer) transformer, a graph-based network such as a graph neural network ("GNN"), graph attention neural network ("GANN"), or graph convolutional neural network ("GCN"), other types of sequence-to-sequence models and/or encoder-decoders, various flavors of a recurrent neural network ("RNN", e.g., long short-term memory, or "LSTM", gate recurrent units, or "GRU", etc.), and any other type of machine learning model that may be applied to facilitate selected aspects of the present disclosure.

In some implementations, code knowledge system 102 may also have access to one or more programming-language-specific corpuses 108-1 to 108-M. In some implementations, these programming-language-specific corpuses 108-1 to 108-M may be used, for instance, to train one or more of the machine learning models 106-1 to 106-N. In some implementations, the programming-language-specific corpuses 108-1 to 108-M may include examples of source code (e.g., entire code bases, libraries, etc.), inline comments, textual metadata associated with source code (e.g., commits), documentation such as textbooks and programming manuals, programming language-specific discussion threads, presentations, academic papers, and so forth.

In some implementations, a client 110 that wishes to enable manipulation of its code base 112 in programming language(s) other than that/those used originally to write the source code may establish a relationship with an entity (not depicted in FIG. 1) that hosts code knowledge system 102. When a developer wishes to view/edit a source code snippet of the entity's code base 112 but is unfamiliar with the native programming language, code translator 104 may provide one or more versions of the source code snippet that is translated to a target programming language preferred by the developer. In some such implementations, code translator 104 may generate the translated source code snippet on the fly, e.g., in real time. In other implementations, code translator 104 may operate, e.g., in a batch mode, to preemptively translate all or selection portions of an entity's code base 112 into a targeted programming language. In some implementations in which the developer then edits the translated source code snippet, the edited version may be translated back into the native programming language or left in the new, target programming language, assuming other necessary infrastructure is in place.

Figure 2:
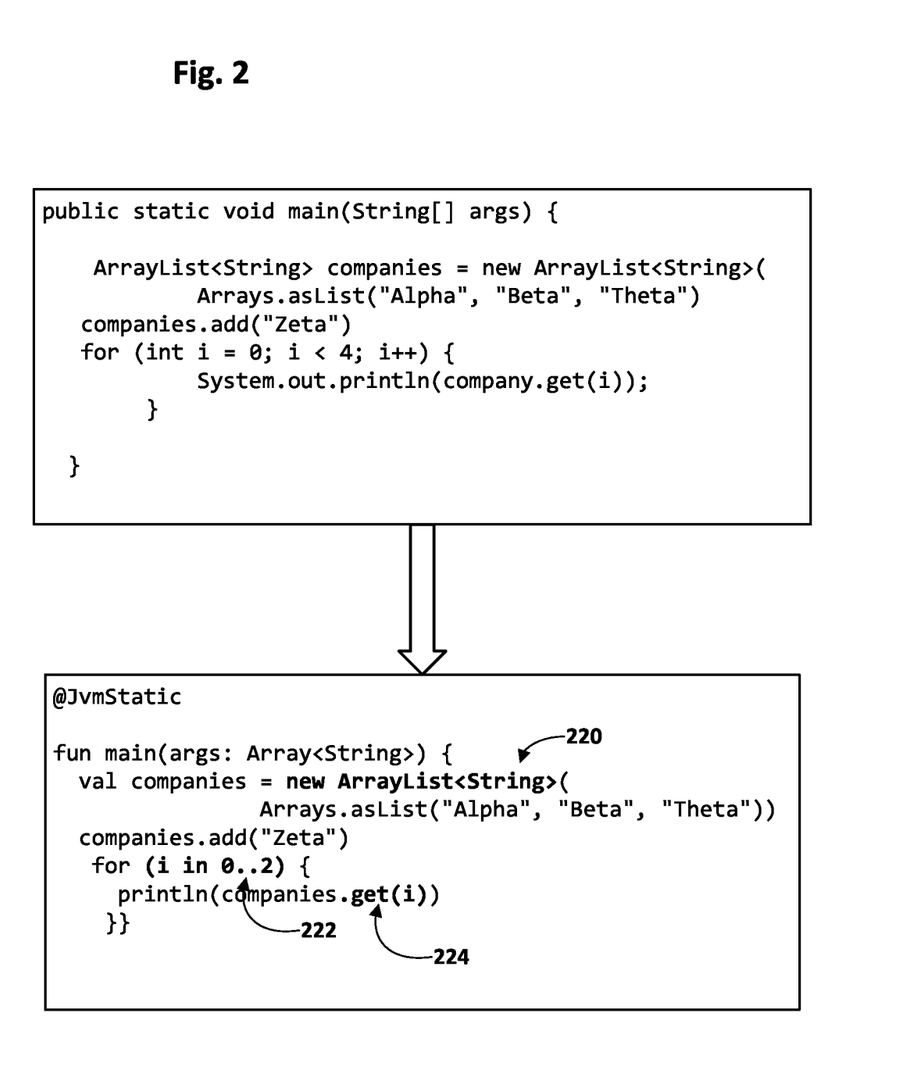
FIG. 2 depicts an example code translation that resulted in errors.

FIG. 2 depicts an example of what happens when source code is initially translated, e.g., by code translator 104, using a neural translator from a first programming language, which is Java at top of FIG. 2, to a second programming language, which is Kotlin at bottom. Three different errors are present in the translated source code at bottom. A first error 220 is a type error: "new ArrayList<String>" should simply be "ArrayList". A second error 222 is a logic error: "(i in 0 . . . 2)" should be "(i in 0 . . . 3)". A third error 224 is an incorrect API error: "get(i)" should be "[i]". Techniques described herein may be implemented to iteratively process the original Java code at top to ultimately generate error-free Kotlin source code.

Figure 3A:
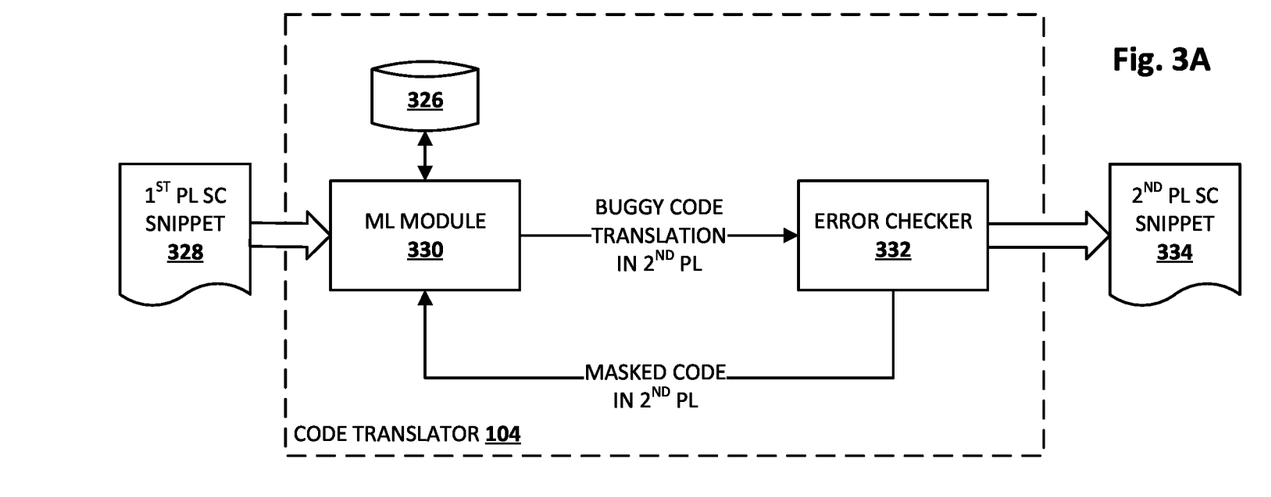
FIG. 3A is a block diagram showing an example of how source code may be iteratively translated, in accordance with various implementations.

FIG. 3A is a block diagram of an example iterative process flow that may be implemented in whole or in part by code translator 104 in order to use a translation machine learning model 326 (also referred to simply as a "translation model 326") to translate a first programming language source code ("PL SC" in FIG. 3A) snippet 328 between programming languages. Code translator 104 may include a machine learning ("ML" in FIG. 3A) module 330 that is configured to process various data using machine learning model(s) to translate source between programming languages.

To start, ML module 330 may process first programming language source code snippet 228 using embeddings of tokens of first programming language source code snippet 228 generated using techniques such as the word2vec framework. ML module 330 may apply these token embeddings as input across layer(s) of translation machine learning model 326 to generate a potentially buggy translation of first programming language source code snippet 228 in a second programming language (e.g., Kotlin). The translation may be evaluated by an error checker 332 to identify one or more errors, such as errors 220-224 in FIG. 2. Error checker 332 may take various forms, such as one or more operative portions of a compiler, a static analyzer, a syntax checker, manual programmer review, and/or a machine learning pipeline in which one or more machine learning models trained to detect errors in source code are applied.

In various implementations, error(s) detected by error checker 332 may be used to insert mask(s) into the translation to generate (e.g., teacher force) masked source code in the second programming language. For example, mask(s)—which as mentioned previously may be predetermined sequences of characters or symbols that are not otherwise found natively in source code—may be inserted in place of the erroneous token(s).

Translation machine learning model 326 may be trained to perform "span correction" so that when translation machine learning model 326 is used to process masked source code (also referred to as "teacher-forcing a masked prefix"), it generates output (infill(s) of corrected source code) only for those portions (or "spans") of source code that are masked. During training, when masked prefixes are presented, training loss may be computed only over the infills of source code, as opposed to over the entire translated source code snippet. Otherwise, if no prefix is provided during a training instance, then left-to-right decoding may be learnt. Thus, both left-to-right decoding and span-infilling tasks can be learnt simultaneously. In some implementations during training, fully correct source code may be randomly masked, and then the randomly masked source code may be processed using the translation machine learning model (e.g., as a prefix), to attempt to predict infills that restore the original code. To the extent predicted infills differ from spans of the original source that were masked, the translation machine learning model may be trained, e.g., using techniques such as stochastic gradient descent, back propagation, etc.

The masked source code in the second programming language may then be processed by ML module 330, once again based on translation machine learning model 326. In some implementations, the masked source code in the second programming language may be processed as a prefix, along with first programming language source code snippet 328. Based on this processing, ML module 330 may generate infill(s) of corrected source code, rather than a whole new translation of first programming language source code snippet 328. Because less output is being generated, and therefore significantly less computational resources are required, a greater beam width (e.g., four) may be used during iterations when masked source code is processed, as compared to the initial processing of first programming language source code snippet 328 by itself (where a lesser beam width, such as one or two, may be used). In some implementations, error checker 332 may be configured to quickly assess the beam results, e.g., without the need for reranking.

The infill(s) of corrected source code may be inserted into locations of a new translation of the first programming language snippet 328 that correspond to the mask(s). The result may be a potentially less buggy source code translation of first programming language snippet 328 in the second programming language. This may once again be evaluated by error checker 332 to identify any remaining error(s). If no errors are detected by error checker 332, then an error-free second programming language source code snippet 334 may, for instance, be provided to downstream processes, presented to a user of IDE 111, etc.

Figure 3B:
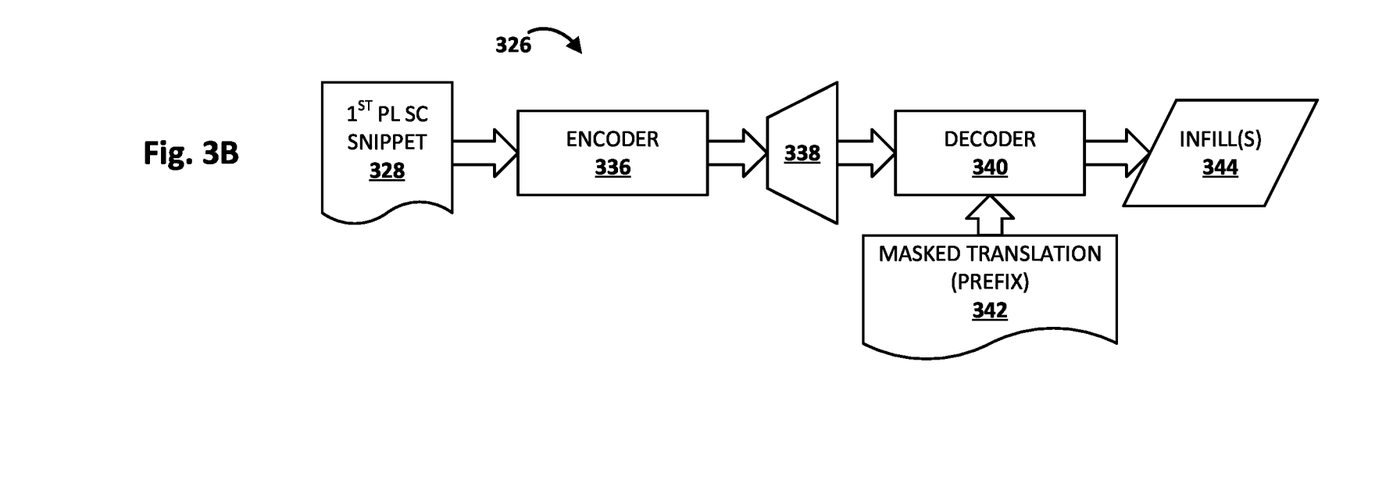
FIG. 3B schematically depicts an example architecture of a translation machine learning model configured with selected aspects of the present disclosure.

FIG. 3B schematically depicts an example architecture of a translation machine learning model 326. Translation machine learning model 326 may include an encoder 336 and a decoder 340. Encoder 336 may be used to process first programming language source code snippet 328 to generate an embedding 338, which may be a semantically rich representation of first programming language source code snippet 328. Embedding 338 may have any number of dimensions, e.g., depending on the vocabulary size, number of tokens in the first programming language source code snippet 328, etc.

Embedding 338 may be processed by decoder 340, e.g., in conjunction with a masked translation 342 of first programming language source code snippet 328 as a prefix. The result of this processing may be some number of infills 344 of corrected source code. In some implementations, the number of infills 344 may correspond to the number of masks inserted into masked translation 342.

Figure 4:
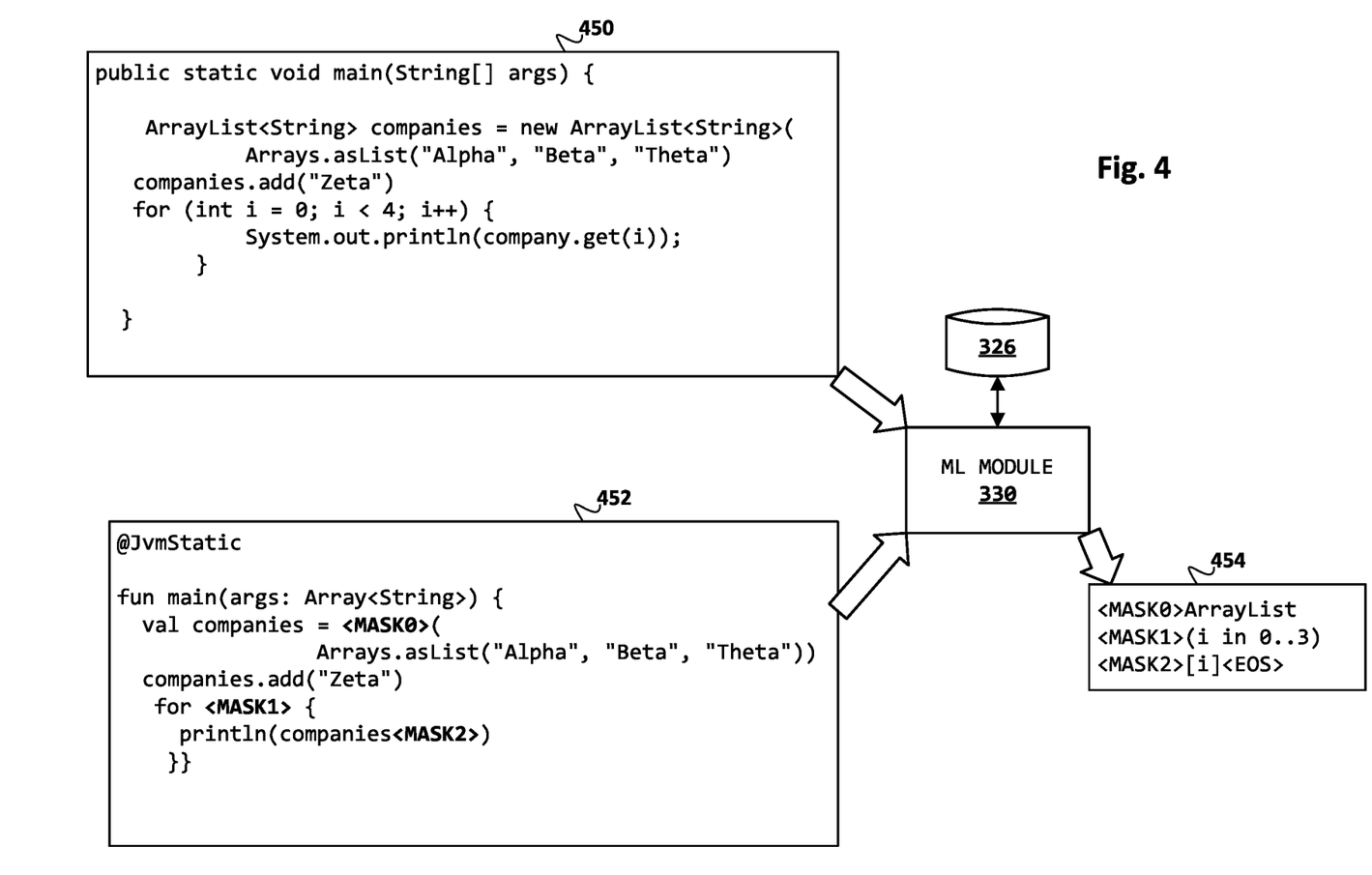
FIG. 4 schematically depicts one example of how original source code and a masked translation of the original source code can be processed to generate infill(s) of corrected source code.

FIG. 4 schematically depicts an alternative view of how original source code 450 and a masked prefix 452 may be processed, e.g., by ML module 430 using translation machine learning model 326, to generate some number of infills 454. As explained previously with respect to FIG. 2, when original source code 450 was processed by code translator 104, it generated a buggy code translation (depicted at bottom in FIG. 2). Those errors 220, 222, and 224 have been replaced in masked translation 452 in FIG. 4 with <MASK0>, <MASK1>, and <MASK2>, respectively. These masks, when processed as part of masked prefix 452 by ML module 330 using translation machine learning model 236, may cause ML module 330 generate output that includes only infills 454. For example, <MASK0> is replaced with corrected source code, "ArrayList". <MASK1> is replaced with corrected source code, "(i in 0 . . . 3)". And <MASK2> is replaced with corrected source code, "[i]".

Figure 5A:
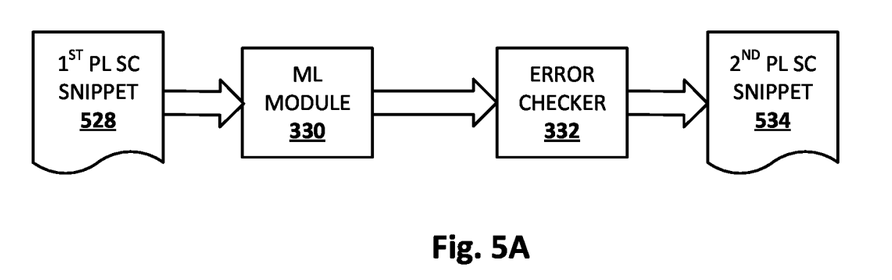
FIG. 5A, FIG. 5B, and FIG. 5C collectively and sequentially demonstrate another example of how source code may be iteratively translated, in accordance with various implementations.
Figure 5B:
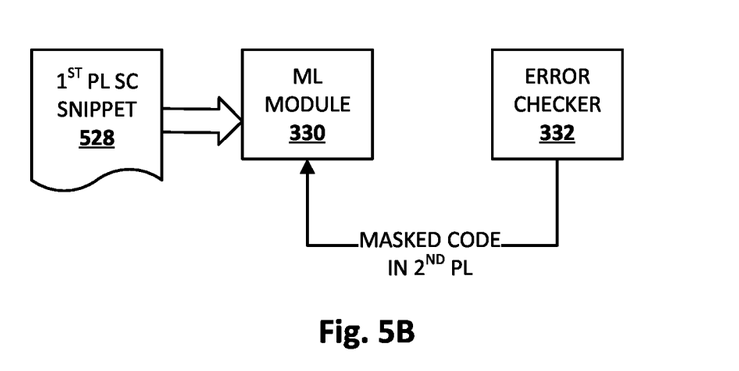
Figure 5C:
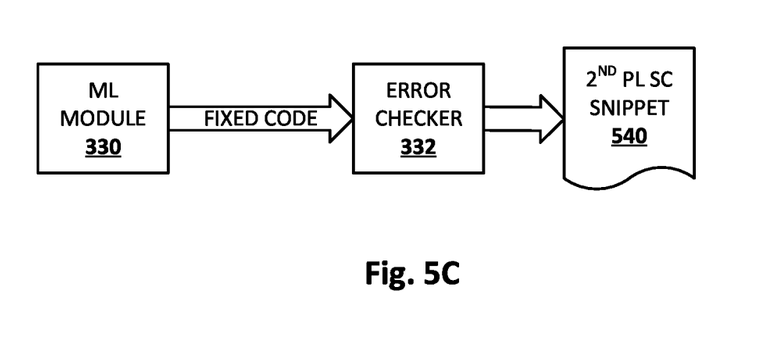

FIGS. 5A-C sequentially demonstrates an example of how iterative translation may unfold. The operations demonstrated by FIGS. 5A-C are similar to those depicted in previous figures. In FIG. 5A, first programming language source code snippet 528 is processed by ML module 330 to generate a potentially buggy translation of first programming language source code snippet 528 in another programming language (or in another style, domain, etc.). This in turn may be evaluated by error checker 332. If no errors are detected, then second programming language source code snippet 534 may be provided and the process may cease.

However, if errors are detected, then as shown in FIG. 5B, a masked version of the translated source code snippet may be provided back to ML module 330. ML module 330 may then process this masked translation, e.g., as a prefix to perform span correction based on first programming language source code snippet 528. As a result, and as depicted in FIG. 5C, "fixed code" may be provided by ML module 330 to error checker 332. If no errors are detected in the "fixed" code, error checker 332 may provide second programming language source code snippet 534 to downstream process(es), such as IDE 111. However, if error checker 332 finds more errors, then the process may proceed back to what is shown in FIG. 5B.

Figure 6:
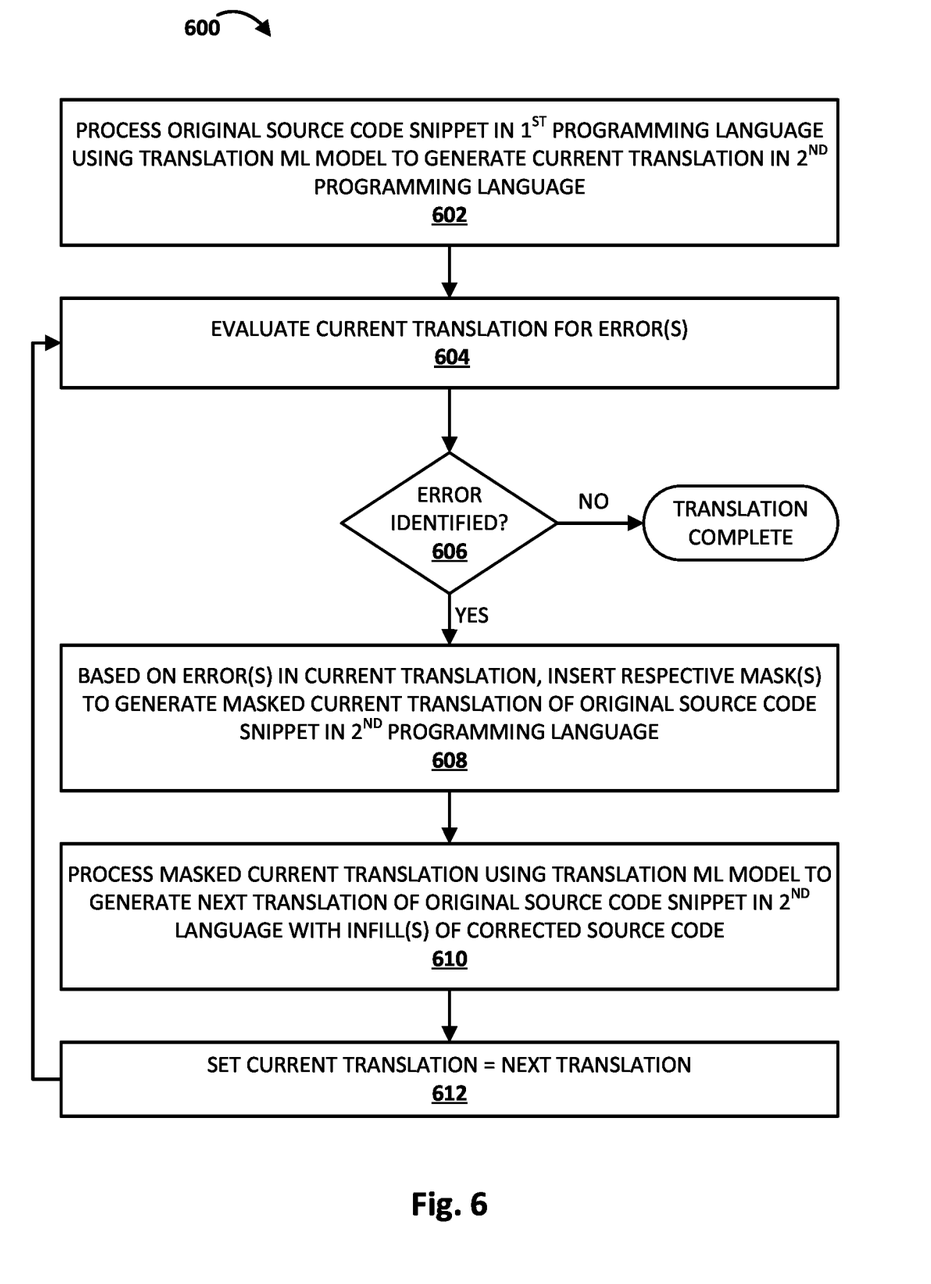
FIG. 6 depicts a flowchart illustrating an example method for practicing selected aspects of the present disclosure.

FIG. 6 is a flowchart illustrating an example method 600 of translating a source code snippet from a first programming language to a second programming language, in accordance with implementations disclosed herein. For convenience, the operations of the flow chart are described with reference to a system that performs the operations. This system may include various components of various computer systems, such as one or more components of code knowledge system 102. Moreover, while operations of method 600 are shown in a particular order, this is not meant to be limiting. One or more operations may be reordered, omitted or added.

At block 602, the system, e.g., by way of code translator 104 and/or ML module 330, may process an original source code snippet in a first programming language using a translation machine learning model (e.g., 326) to generate a "current" translation of the original source code snippet in a second programming language. In other implementations, rather than being in an entirely different language, the current translation may be in a different domain. For example, the original source code may be known to have bugs, and the current translation may be an attempt to remove these bugs using neural translation. As another example, the original source code may be written in one style, and the current translation may be written in another style (e.g., imposed by an employer or standard).

At block 604, the system, e.g., by way of error checker 332, may evaluate the current translation of the original source code snippet to identify one or more errors in the first translation of the original source code snippet. For example, error checker 332 may include a static analyzer or syntax checker that is designed to flag syntactical or other errors in the current translation. In some implementations, error checker 332 may attempt to compile the current translation, e.g., using a compiler built for the second programming language. Any compile time errors (e.g., syntax errors, type errors, memory allocation errors, mismatched brackets, undefined methods, type mismatches, etc.) may be flagged. In some implementations, if compilation is successful, e.g., without error warnings, error checker 332 may execute the resulting binary (or bytecode, as the case may be) to identify execution errors on a set of test cases.

At block 606, if no errors are detected, then method 600 may terminate and the translation may be complete. However, if error(s) are detected at block 606, then at block 608, based on the one or more errors identified at block 604 in the current translation of the original source code snippet, the system may insert one or more respective masks to generate a masked current translation of the original source code snippet in the second programming language.

At block 610, the system, e.g., by way of code translator 104 and/or ML module 330, may process the masked current translation of the original source code snippet using the translation machine learning model to generate a next translation of the original source code snippet in the second language. In some implementations, this processing may include processing the original source code snippet as well, with the masked current translation being processed as a prefix. The next translation may include one or more infills of corrected source code in place of one or more of the masks.

At block 612, the system may set the next translation to be the current translation. Method 600 may then proceed back to block 604, in which the (new) current translation is evaluated for error(s). If no errors are detected at block 606, then method 600 may terminate; otherwise, method 600 may proceed back through blocks 608-612, as described previously.

Figure 7:
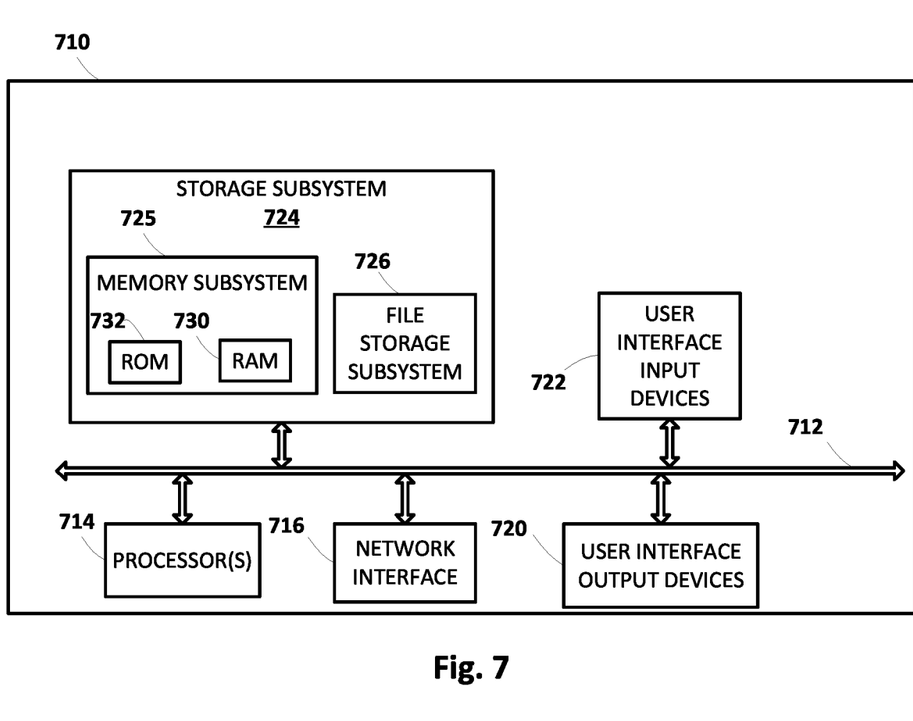
FIG. 7 illustrates an example architecture of a computing device.

FIG. 7 is a block diagram of an example computing device 710 that may optionally be utilized to perform one or more aspects of techniques described herein. Computing device 710 typically includes at least one processor 714 which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 716. The input and output devices allow user interaction with computing device 710. Network interface subsystem 716 provides an interface to outside networks and is coupled to corresponding interface devices in other computing devices.

User interface input devices 722 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computing device 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 710 to the user or to another machine or computing device.

Storage subsystem 724 stores programming and data constructs that provide the functionality of some or all of the modules described herein. For example, the storage subsystem 724 may include the logic to perform selected aspects of the method of FIG. 6, as well as to implement various components depicted in FIGS. 1, 3A, 3B, 4, and 5A-C.

These software modules are generally executed by processor 714 alone or in combination with other processors. Memory 725 used in the storage subsystem 724 can include a number of memories including a main random-access memory (RAM) 730 for storage of instructions and data during program execution and a read only memory (ROM) 732 in which fixed instructions are stored. A file storage subsystem 726 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computing device 710 communicate with each other as intended. Although bus subsystem 712 is shown schematically as a single bus, alternative implementations of the bus subsystem may use multiple buses.

Computing device 710 can be of varying types including a workstation, server, computing cluster, blade server, server farm, or any other data processing system or computing device. Due to the ever-changing nature of computers and networks, the description of computing device 710 depicted in FIG. 7 is intended only as a specific example for purposes of illustrating some implementations. Many other configurations of computing device 710 are possible having more or fewer components than the computing device depicted in FIG. 7.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented using one or more processors and comprising:
    processing an original source code snippet in a first programming language using a translation machine learning model to generate a first translation of the original source code snippet in a second programming language;
    evaluating the first translation of the original source code snippet to identify one or more errors in the first translation of the original source code snippet;
    based on the one or more errors in the first translation of the original source code snippet, inserting one or more respective masks to generate a masked first translation of the original source code snippet in the second programming language; and
    processing the masked first translation of the original source code snippet using the translation machine learning model to generate a second translation of the original source code snippet in the second language, wherein the second translation includes one or more infills of corrected source code in place of one or more of the masks.

2. The method of claim 1, wherein the masked first translation of the original source code snippet is processed using the translation machine learning model in conjunction with the original source code snippet in the first programming language.

3. The method of claim 2, wherein the masked first translation of the original source code snippet is processed using the translation machine learning model as a prefix.

4. The method of claim 3, wherein the translation machine learning model comprises an encoder and a decoder, the original source code snippet is processed using the encoder, and the masked first translation of the original source code snippet is processed as the prefix using the decoder.

5. The method of claim 1, wherein the evaluation of the first translation of the original source code snippet is performed using a static analyzer or a syntax checker.

6. The method of claim 1, wherein the evaluation of the first translation of the original source code snippet is performed by compiling the first translation to generate an executable program, and executing the executable program using one or more test cases.

7. The method of claim 1, wherein the evaluation of the first translation of the original source code snippet is performed using one or more confidence properties of the translation machine learning model.

8. The method of claim 1, wherein the evaluation of the first translation of the original source code snippet is performed using a machine learning model trained to detect errors in source code.

9. The method of claim 1, wherein the masked first translation of the original source code snippet is processed with a greater beam width than the original source code snippet.

10. The method of claim 1, wherein the one or more errors comprise a first error, the one or more masks comprise a first mask, the second translation includes a first infill of corrected source code in place of the first mask, and the method further comprises:
    evaluating the second translation of the original source code snippet to identify a second error in the second translation of the original source code snippet;
    based on the second error in the second translation of the original source code snippet, inserting a second mask to generate a masked second translation of the original source code snippet in the second programming language; and
    processing the masked second translation of the original source code snippet using the translation machine learning model to generate a third translation of the original source code snippet in the second language, wherein the third translation includes a second infill of corrected source code in place of the second mask.

11. The method of claim 1, wherein the inserting comprises replacing the one or more errors with the one or more masks.

12. A method implemented using one or more processors and comprising:
processing an original source code snippet in a first domain using a neural language model to generate a first translation of the original source code snippet in a second domain;
evaluating the first translation of the original source code snippet to identify one or more errors in the first translation of the original source code snippet in the second domain;
based on the one or more errors in the first translation of the original source code snippet, inserting one or more respective masks to generate a masked first translation of the original source code snippet in the second domain; and
processing the masked first translation of the original source code snippet using the neural language model to generate a second translation of the original source code snippet in the second domain, wherein the second translation includes one or more infills of corrected source code in place of one or more of the masks.

13. The method of claim 12, wherein the masked first translation of the original source code snippet is processed using the neural language model in conjunction with the original source code snippet.

14. The method of claim 13, wherein the masked first translation of the original source code snippet is processed using the neural language model as a prefix.

15. The method of claim 14, wherein the neural language model comprises an encoder and a decoder, the original source code snippet is processed using the encoder, and the masked first translation of the original source code snippet is processed as the prefix using the decoder.

16. The method of claim 12, wherein the evaluation of the first translation of the original source code snippet is performed using a static analyzer, compiler, and/or a syntax checker.

17. A system comprising one or more processors and memory storing instructions that, in response to execution by the one or more processors, cause the one or more processors to:
process an original source code snippet in a first programming language using a translation machine learning model to generate a first translation of the original source code snippet in a second programming language;
evaluate the first translation of the original source code snippet to identify one or more errors in the first translation of the original source code snippet;
based on the one or more errors in the first translation of the original source code snippet, insert one or more respective masks to generate a masked first translation of the original source code snippet in the second programming language; and
process the masked first translation of the original source code snippet using the translation machine learning model to generate a second translation of the original source code snippet in the second language, wherein the second translation includes one or more infills of corrected source code in place of one or more of the masks.

18. The system of claim 17, wherein the masked first translation of the original source code snippet is processed using the translation machine learning model in conjunction with the original source code snippet in the first programming language.

19. The system of claim 18, wherein the masked first translation of the original source code snippet is processed using the translation machine learning model as a prefix.

20. The system of claim 19, wherein the translation machine learning model comprises an encoder and a decoder, the original source code snippet is processed using the encoder, and the masked first translation of the original source code snippet is processed as the prefix using the decoder.

* * * * *